US00RE35795E

United States Patent [19]

Kim et al.

[11] E Patent Number: Re. 35,795

[45] Reissued Date of Patent: May 12, 1998

[54] METHOD OF MAKING FLOWABLE ALKALINE THIOSULFATE/ALKALINE SULFITE AND THE PRODUCT THEREOF

[75] Inventors: Hongzoon Kim, Boonton; Charles J. Pfeiffer, Wayne, both of N.J.

[73] Assignee: Fuji Hunt Photographic Chemicals, Inc., Paramus, N.J.

[21] Appl. No.: 676,063

[22] Filed: Jul. 5, 1996

Related U.S. Patent Documents

Reissue of:

[64] Patent No.: 5,328,814
Issued: Jul. 12, 1994
Appl. No.: 118,593
Filed: Sep. 10, 1993

U.S. Applications:

[62] Division of Ser. No. 828,672, Jan. 31, 1992, Pat. No. 5,270,154.

[51] Int. Cl.[6] ..... G03C 5/38

[52] U.S. Cl. ..... 430/458; 430/455; 430/459

[58] Field of Search ..... 430/455, 458, 430/459

[56] References Cited

U.S. PATENT DOCUMENTS

| | | | |
|---|---|---|---|
| 2,203,903 | 6/1940 | Ham | 430/543 |
| 2,475,616 | 7/1949 | Ingraham | 430/458 |
| 2,515,577 | 9/1950 | Waldeck | 252/539 |
| 2,578,075 | 12/1951 | Kienast | 430/458 |
| 2,579,380 | 12/1951 | Funderburk | 252/526 |
| 2,589,108 | 3/1952 | Mark | 252/99 |
| 2,782,121 | 2/1957 | Goldhammer | 430/456 |
| 2,871,121 | 1/1959 | Kimura et al. | 430/453 |
| 2,893,865 | 7/1959 | Welliver et al. | 430/456 |
| 2,905,532 | 9/1959 | Thompson | 423/268 |
| 3,169,992 | 2/1965 | Henn | 430/455 |
| 3,350,168 | 10/1967 | Ziegler | 423/265 |
| 3,512,929 | 5/1970 | Mack | 430/455 |
| 4,517,381 | 5/1985 | Takematsu et al. | 564/207 |
| 4,749,812 | 6/1988 | Takematsu et al. | 564/218 |
| 4,923,786 | 5/1990 | Kühnert et al. | 430/450 |
| 5,030,244 | 7/1991 | Neumann et al. | 8/526 |
| 5,055,384 | 10/1991 | Kühnert et al. | 430/450 |
| 5,135,840 | 8/1992 | Reuter et al. | 430/449 |

FOREIGN PATENT DOCUMENTS

| | | |
|---|---|---|
| 1245937 | 2/1961 | France . |
| 4019739 | 1/1992 | Japan . |

OTHER PUBLICATIONS

Dialog Abstract #007897787, JP 1106857 (Kao Corp.) Apr. 24, 1989.

W. R. Grace Material Safety Data publication on DAXAD, dated Jun. 12, 1989.

Ammonium sulfite, Hackh's Chemical Dictionary, p. 40, McGraw–Hill Book Company, 1969.

Ammonium sulfide, The Condensed Chemical Dictionary, p. 55, Van Nostrand Reinhold Company, 1971.

*Primary Examiner*—Hoa Van Le

*Attorney, Agent, or Firm*—Burns, Doane, Swecker & Mathis

[57] ABSTRACT

A method for making flowable alkaline thiosulfate, flowable alkaline sulfite, or a combination of the two, by blending an alkaline thiosulfate, an alkaline sulfite, or a combination of the two, with an alkali metal [arylsulfonate.formaldehyde] *arylsulfonate•formaldehyde* in an amount effective to render the alkaline thiosulfate, the alkaline sulfite, or the combination freely flowable, and the product of this method. It has been found that the product of this method, such as freely flowable ammonium thiosulfate powder mixture, can be stored in a freely flowable condition for extended periods of time and can be dissolved into solution readily to form a clear non-turbid solution. The freely flowable ammonium thiosulfate powdered mixture of the present invention is particularly useful as a photographic fixative and bleach fixative for processing photographic elements.

25 Claims, No Drawings

METHOD OF MAKING FLOWABLE ALKALINE THIOSULFATE/ALKALINE SULFITE AND THE PRODUCT THEREOF

Matter enclosed in heavy brackets [ ] appears in the original patent but forms no part of this reissue specification; matter printed in italics indicates the additions made by reissue.

This is a divisional of application Ser. No. 07/823,672 filed Jan. 31, 1992, now U.S. Pat. No. 5,270,154.

FIELD OF THE INVENTION

The invention relates to a method for preparing either a freely flowable alkaline thiosulfate, a freely flowable alkaline sulfite, or a combination of the two. For this purpose, the alkaline thiosulfate, particularly ammonium thiosulfate, or alkaline sulfite, particularly ammonium sulfite, or a combination of the two, is admixed with a dry alkali metal [arylsulfonate.formaldehyde] *arylsulfonate•formaldehyde*, particularly an alkali metal [naphthalenesulfonate.formaldehyde] *naphthalenesulfonate•formaldehyde*, to provide a freely flowable powder mixture.

BACKGROUND OF THE INVENTION

It is well known that ammonium thiosulfate is acutely hygroscopic and unstable, and as a result, tends to agglomerate and cake, a phenomenon which is also known for other ammonium salts such as, for example, ammonium sulfite. This tendency to clump or cake represents a serious disadvantage since the caked salt must be mechanically crushed to enable measurement and dosage thereof.

However, a free flowing stable ammonium thiosulfate has been highly desired for the production of stable so-called "rapid-fix" salt mixtures, particularly in the photographic processing field, which are portable, easily measurable and readily soluble in water.

Towards this end, prior attempts to alleviate the ammonium thiosulfate caking problems have encompassed both physical treatments of the ammonium thiosulfate as well as blending of additives thereto. For instance, U.S. Pat. No. 5,055,384 describes blending ammonium thiosulfate with an alkali disulfate and thereafter milling the blend to within a average particle diameter of from 150 to 300 μm in order to improve the flowing properties of the ammonium thiosulfate. On the other hand, U.S. Pat. No. 3,512,929 discloses blending dry crystalline ammonium thiosulfate with small amounts of sodium thiosulfate in order to discourage the clumping behavior of the ammonium thiosulfate.

On the other hand, alkyl aryl sulfonate compounds are widely-known as a detergent agent, e.g., as seen in U.S. Pat. Nos. 2,515,577 and 2,579,380. Also, sodium salts of formaldehyde condensation products of beta-naphthalene sulphonic acid have also been proposed for use a dispersing agent for chlorinated lime powder as described in U.S. Pat. No. 2,589,108. Additionally, use of alkyl naphthalene sulfonates as a wetting agent for mixtures of alkali oxalate and anhydrous alkali thiosulfate is also suggested in U.S. Pat. No. 2,578,075.

In addition to the caking problem another problem heretofore associated with alkali thiosulfate was that the material was not readily soluble or dissolved and formed a turbid solution due to inadvertent liberation of decomposition products, such as sulfur particulates. In this regard, U.S. Pat. No. 3,350,168 describes blending ammonium salts of weak acids with the ammonium thiosulfate in an effort to prevent liberation of such decomposition products. As another approach. U.S. Pat. No. 2,203,903 describes combining alkali thiosulfate with sodium sulfite, sodium acetate, citric acid and alum to inhibit formation of sulfur in the fixing bath from the decomposition of the thiosulfate.

SUMMARY OF THE INVENTION

It is an object of the present invention to provide an improved form of preparation of alkaline thiosulfates, particularly ammonium thiosulfate, and alkaline sulfites, particularly ammonium sulfite, which are freely flowable and can be easily dosed and rapidly dissolved to produce a clear solution.

The present inventors have discovered that these and other objects of the present invention can be achieved when either an alkaline thiosulfate, such as ammonium thiosulfate ($(NH_4)_2S_2O_3$), or an alkaline sulfite, such as ammonium sulfite ($(NH_4)_2SO_3$), is blended with a dry alkali metal [naphthalene sulfonate-formaldehyde] *naphthalenesulfonate•formaldehyde* [$(C_{10}H_8O_3S.CH_2\overline{O})x.xM$] $(C_{10}H_3O_3S{\bullet}CH_2O)x{\bullet}xM$, where x can be in the range of 1 to 50, and M is an alkali metal. The alkaline sulfite can be an alkaline sulfite monohydrate or an anhydrous alkaline sulfite capable of absorbing water.

For example, ammonium thiosulfate, which otherwise becomes caked as a raw material, becomes uniform and free-flowing when combined with an alkali metal [naphthalenesulfonate.formaldehyde] *naphthalenesulfonate•formaldehyde* alone or as combined with ammonium sulfite.

It has further been discovered that there is no particular limitation an the order of mixing of the three components of alkali metal [naphthalenesulfonate.formaldehyde] *naphthalenesulfonate•formaldehyde*, alkaline thiosulfate and alkaline sulfite, such as alkaline sulfite, insofar as obtaining a freely flowable alkaline thiosulfate/alkaline sulfite admixture.

For instance, the alkali metal [naphthalenesulfonate.formaldehyde] *naphthalenesulfonate•formladehyde* can be preblended with either the alkaline sulfite or the alkaline thiosulfate before combination with the remaining component, or it can be mixed with a preblended mixture of the alkaline sulfite and the alkaline thiosulfate.

Accordingly, in one embodiment, this invention provides a flowable powdered mixture comprising alkaline thiosulfate, alkaline sulfite and alkali metal [naphthalenesulfonate.formaldehyde] *naphthalenesulfonate•formaldehyde*.

In a further embodiment of this invention, this invention provides a method for making a flowable powdered mixture of alkaline thiosulfate, alkaline sulfite and alkali metal [naphthalenesulfonate.formaldehyde] *naphthalenesulfonate•formaldehyde*.

DERAILED DESCRIPTION OF THE INVENTION

Due to the free-flowing behavior of the alkaline thiosulfate powder mixture of the present invention, it has been discovered that the resulting powdered granulate containing the powder constituents of the present invention is particularly useful as the fixer portion of a powder fix or bleach-fix mixture for processing of photographic materials. That is, photographic fixatives and bleach fixatives conventionally contain a thiosulfate as a fixing agent which is required to dissolve undeveloped silver halide and silver halide formed by bleaching of the metallic silver from the photographic material. Powder fixatives are preferred over liquid preparations due to their increased stability and the handling cost associated with bulky liquid preparations.

In contrast, the freely flowing stable alkaline thiosulfate powdered mixtures of the present invention can be packaged in a sealed container which is impervious to water vapor, for example, by vacuum packaging techniques, to provide a "rapid fix" salt mixture having long shelf life and stability. Additionally, the alkaline thiosulfate powdered mixtures of the present invention may not only be packaged alone, but also may be admixed with a granulated bleaching agent and then packaged together to provide a single dry powder bleach-fix product.

For example, suitable granulated bleaching agents in this regard include ferric ammonium ethylene diamino tetracetic acid (EDTA) and ferric ammonium propylene diamino tetraacetic acid (PDTA) and other known aminopolycarboxylic aced derivatives. Other examples of suitable bleaching agents for use as bleaching agents in the present invention are described in U.S. Pat. No. 5,061,608.

Also, silver bleaches such as ferric ammonium EDTA and ferric ammonium PDTA, and substances for adjusting the pH, such as sodium carbonate, may be used as additional additives of the alkaline thiosulfate powdered mixtures of the present invention.

For the preparation of the bleach fixative embodiment of the present invention, the granulates of fixative and bleaching agent are preferably prepared separately and subsequently mixed together before packaging.

For instance, the alkaline thiosulfate powder mixture of the present invention can be combined with ferric ammonium salts of EDTA and/or PDTA, and with other bleaching agents, to provide a single dry powder bleach-fix regenerator powder for photographic print development.

Other substances may be added to the powder blend of the present invention, with or without the bleaching agent, to confer desirable properties such as antistatic agents, antidusting agents, and wetting agents. Antistatic agents can include organic quaternary ammonium salts and other useful agents. Antidusting agents may include amines, amides, glycols, ethers, alcohols, esters, ketones, polyvinylpyrrolidone, polyacrylic acid or salts thereof, siloxanes, various carboxylic and sulfonic acids, or salts thereof, starch or sugar derivatives, and other useful agents. Wetting agents can be chosen either individually or in combination from the groups of anionic, nonionic, cationic, or zwitterionic surfactants. Useful surfactants are described in the following references: Garrett. H. E. (1973), "Surface Active Chemicals", Pergamon Press, Oxford; Ash, M. and Ash, I. (1981), "Encyclopedia of Surfactants", Chemical Publishing Co., New York; Surfactant Science Series, in 40 volumes, Marcel Dekker, Inc., New York; Flick, Ernest W. (1988) "Industrial Surfactants" Noyes Publ., Park Ridge, N.J.; Stache, Helmut, Editor (1981) "Surfactant Handbook" 2nd Ed., Carl Hanser Verlag, Munich, Fed. Rep. Germany.

Whether the freely flowable fixing powder of the present invention is ultimately packaged with or without a bleaching agent, there is no particular limitation on the order of mixing of the three components of the fixing powder being alkali metal [naphthalenesulfonate.formaldehyde] *naphthalenesulfonate•formaldehyde*,alkaline thiosulfate and alkaline sulfite insofar as obtaining the freely-flowable alkaline thiosulfate or ammonium sulfite.

As a consequence of the anti-caking effect obtained by the present invention, the original finely divided crystalline form of the alkaline thiosulfate or alkaline sulfite is maintained for extended periods after packaging and during shipping and storage.

A further discovery of the present invention has been the significant improvement in stability of the final fixer or bleach-fix formulation powder formulations of the present invention insofar as decreasing the extent of sulfurization.

As little as 0.05% by weight of an alkali metal naphthalene sulfonate, based on the weight of the alkaline sulfite, has been observed to produce a noticeable anti-caking effect. It also has been discovered that other organic compounds containing aryl, alkyl, or arylalkyl functionality coupled with an electronegative functional group comprising one or more of the following: sulfonate, sulfate, carboxylate, hydroxyl, and the like, also impart anti-caking properties to alkaline thiosulfate or sulfite. The alkaline thiosulfate can include ammonium, potassium, and sodium salts used individually or in combination. Similarly alkali metal sulfite salts can also be selected from this group.

The alkali metal [arylsulfonate.formaldehyde] *arylsulfonate•formaldehyde* can be selected from commercially available products. For instance, an exemplary alkali metal [arylsulfonate.formaldehyde] *arylsulfonate•formaldehyde* is potassium [naphthalenesulfonate.formaldehyde] *naphthalenesulfonate•formaldehyde* which is also described by the synonyms K NS-F and naphthalenesulfonic [acid-.formaldehyde] *acid•formaldehyde* potassium, and its product CAS number is 67828-14-2, K NS-F is a potassium salt of a formaldehyde condensation product of naphthalene sulfonic acid.

Also, K NS-F is commercially available under the tradename Daxad® (from W.R. Grace). Daxad® also contains small amounts of potassium sulfate and water in addition to the principal component of K NS-F. Daxad® is an amber powder having a slight mothball odor and is miscible in water.

The alkaline sulfite is suitable for mixture with the alkaline thiosulfate without the necessity of performing a drying pretreatment thereon when the moisture content of the alkaline sulfite is below about 2.0 wt %, and vice versa.

By way of illustration and not limitation, in one embodiment of the present invention, a preblend mixture of alkaline sulfite and alkali metal [naphthalentesulfonate.formaldehyde] *naphthalenesulfonate•formaldehyde* is prepared and acts as a homogenizer and an anti-caking agent during subsequent blending with the alkaline thiosulfate. As a result, the resulting powder mixture of the present invention is mechanically stable, agglomerate free and dissolves very rapidly into solution without producing a turbid solution.

That is, in this particular embodiment of the invention, it has been discovered that a freely flowable condition of an alkaline thiosulfate, particularly, ammonium thiosulfate can be provided and caking prevented by admixing the thiosulfate salt with a preblended dried mixture comprising alkaline sulfite combined with small amounts, at least about 0.05% by weight of the mixture weight with the alkaline sulfite, of an alkali metal [naphthalenesulfonate.formaldehyde] *naphthalenesulfonate•formaldehyde*.

Also, where ammonium sulfite is used as the alkaline sulfite, Applicants have also discovered that the addition of alkali earth metal metalbisulfites, such as potassium or sodium metabisulfite, to the ammonium sulfite, greatly improves the stability of the ammonium sulfite in the preblended mixture.

For instance, the present inventors have discovered that the decomposition of ammonium sulfite, which otherwise tends to occur, is decreased when potassium metabisulfite is added in amounts of about 8% or more of the total weight of the preblend mixture. An exemplary formulation of this improved preblended mixture can be about 90–54 wt % ammonium sulfite, about 8–44 wt % potassium metabisulfite and about 2.5–2.7 wt % Daxad®. As in other embodiments of the present invention, the Daxad® is added to provide flowability to the alkaline sulfite-containing mixture, i.e., the stabilized ammonium sulfite in this instance.

A basic illustrative scheme of the method of this particular embodiment of the present invention, using ammonium thiosulfate as exemplary of the alkaline thiosulfate, and using ammonium sulfite monohydrate as exemplary of the alkaline sulfite, is as follows:

1. Ammonium sulfite monohydrate is preblended with 0.1 to 10% by weight of alkali metal [naphthalenesulfonate.formaldehyde] *naphthalenesulfonate•formaldehyde*.
2. If the moisture content the resulting mixture is above about 2.0 wt %, then the above-preblended mixture is dried (a) at 80° C. for 1.5 to 2 hours, (b) at room temperature for approximately 12 hours, (c) at 50° C. for 1.5 to 2 hours under a vacuum of 30 inches Hg or (d) at a temperature and for a time and pressure condition substantially equivalent to (a) or (b) or (c).
3. The dry preblended mixture is then ground or pulverized into almost a granular or powder form.

The preblended mixture is ground or crushed generally to a particle size of between 50 and 3000 μm, preferably between 100 and 200 μm. The ammonium sulfite and alkaline [naphthalenesulfonate.formaldehyde] *naphthalenesulfonate•formaldehyde* are blended for 2 to 5 minutes with either a mortar and pestle or in a suitable jar mill. Other equipment commonly applied to the gentle blending and size reduction of powders can be used for this purpose. Such useful blending equipment may include: various mills (fluid energy, attrition, roll, ball, hammers revolving), crushers (roll, jaw), blenders and the like.

4. Then, the thus-treated preblended mixture is blended with ammonium thiosulfate. The ammonium thiosulfate becoming uniform and free-flowing when combined with the dried preblended mixture of ammonium sulfite monohydrate and alkali metal [naphthalenesulfonate.formaldehyde] *naphthalenesulfonate•formaldehyde*.

The dried ammonium thiosulfate powder mixture consists of a white to slightly off-white, uniform powder between 100 to 200 microns in particle diameter, with no significant agglomeration. Any agglomerates which are present appear as soft, fluffy aggregates which readily break down into a finely divided state upon slight agitation. More importantly, the powder mixture shows no tendency for reagglomeration on standing when exposed to the air under room temperature and 50% relative humidity for several days.

For this embodiment, it has been found that useful results are obtained when the alkaline sulfite, such as ammonium sulfite monohydrate, is present in an amount between about 90.0 and 99.9% by weight of the initial mixture with the alkali metal [naphthalenesulfonate.formaldehyde]*naphthalenesulfonate•formaldehyde* alone; an in an amount of between about 20 and 60% by weight of the final mixture weight ("final mixture" meaning the combined weight of the preblend comprising alkaline sulfite and alkali metal [naphthalenesulfonate.formaldehyde] *naphthalenesulfonate•formaldehyde* and alkali thiosulfate"). A preferred amount of use for alkaline sulfite is between about 97.0 and 99.0% of the initial preblend mixture weight, and between about 30 to 50% by weight of the final mixture weight.

For the amounts of the alkali metal [arylsulfonate.formaldehyde] *arylsulfonate•formaldehyde*, useful amounts are generally between about 0.1 and 10% by weight of the initial mixture with alkaline sulfite alone, and generally from about 0.05 and 10% of the final mixture weight. The preferred amount of use is between about 0.5 to 5% by weight of the initial mixture with alkaline sulfite alone, and between about 0.1 and 2.0% by weight of the final mixture weight.

The amounts for potassium [naphthalenesulfonate.formaldehyde] *naphthalenesulfonate•formaldehyde*, in particular, are generally between about 0.1 and 10%, and preferably between about 0.5 and 5% by weight of the initial mixture with alkaline sulfite alone; and generally between about 0.05 and 10%, and preferably between about 0.1 and 2%, by weight, of the final mixture weight.

As to the amounts of the alkaline thiosulfate component, such as ammonium thiosulfate, useful amounts are generally between about 40 and 80% by weight of the final mixture weight, and preferably in a range amount between about 50 to 70% by weight of the final mixture weight.

This invention will now be illustrated in more detail by reference to the following example. However, the invention should be not construed as being limited thereto. Unless otherwise indicated herein, all parts, percents, ratios and the like are by weight.

EXAMPLES

Example I

The effect of Daxad® concentration on ammonium sulfite monohydrate powder morphology, with no predrying of either component, was evaluated as follows using the following samples were prepared:

| | Grams Used Component | |
|---|---|---|
| | Ammonium Sulfite Monohydrate | Daxad II KLS |
| Sample 1 | 10.0 | 0.0 |
| Sample 2 | 10.0 | 0.05 |
| Sample 3 | 10.0 | 0.1 |
| Sample 4 | 10.0 | 0.25 |
| Sample 5 | 10.0 | 0.5 |

All samples were ground for 2 minutes with a mortar and pestle. After grinding, the samples were transferred to a petri dish, in a thin, uniform layer of not more than 5 mm in thickness, covered with loose fitting glass cover, and allowed to stand at 21° C. and 40% RH (ambient conditions) for seven days.

After seven days, Sample 1 contained large hard agglomerates, that required much effort to break apart. Samples 2 and 3 consisted of small, brittle agglomerates that required less effort to break apart. Sample 4 consisted of few agglomerates that required very little effort to break apart. Finally, Sample 5 contained no agglomerates and readily flowed.

Example II

The effect of moisture on the flowability of Daxad®, sulfite and thiosulfate powder formulations containing an antistatic agent, Polyglycol E-200™ (PE-200), a polyethylene glycol product available from Dow Chemical) was evaluated as follows.

| | Grams Used |
|---|---|
| Daxad II KLS | 0.17 |
| Ammonium Sulfite Monohydrate | 5.77 |
| Ammonium Thiosulfate | 7.25 |
| PE-200 as 1% solution in ethanol | 0.25 |

Preblends of ammonium sulfite, Daxad®, and PE-200 ethanolic solution were ground in a mortar and pestle until the ethanol had evaporated. These preblends were then dried at 50° C. and 30 in. Hg vacuum for various times. Ammonium thiosulfate was then added to each of the preblends by grinding in a mortar and pestle. Samples of the final powder blends were analyzed for adsorbed moisture by n-propanol extraction and Karl Fischer titration, and flowability was evaluated. The results are as follows:

| Drying Times | Powder Character | % Absorbed Moisture |
|---|---|---|
| No drying | Hard agglomerates, Not easily flowable | 2.4 |
| 10 minutes | Few agglomerates, somewhate flowable | 1.75 |
| 30 minutes | No distinct agglomerates, readily flowable | 1.47 |
| 60 minutes | No agglomerates, readily flowable more finely divided than sample dried for 30 minutes | 1.45 |

Example III

To prepare the fixer portion of a color print bleach-fix formulation, the following test samples were prepared to evaluate different levels of Daxad II KLS on the flowability of the mixture.

| | Grams Used Component | | |
|---|---|---|---|
| | Daxad II KLS | Ammonium Sulfite Monohydrate | Thiosulfate |
| Sample 1 | 0.0 | 20.0 | 30.0 |
| Sample 2 | 0.2 | 20.0 | 30.0 |
| Sample 3 | 0.4 | 20.0 | 30.0 |
| Sample 4 | 0.6 | 20.0 | 30.0 |

The Daxad® was added to the sulfite to form a preblend that was ground for 3 minutes in a mortar and pestle. The preblend was transferred to a petri dish, in a thin, uniform layer of not more than 5 mm in thickness, for subsequent drying. One half of the preblend was dried in a vacuum oven at a temperature of 50° C. and a vacuum of 30 in. Hg for two hours. The other half was dried at 21° C. (room temperature) under the same vacuum for 17 hours (overnight).

Preblend Sample 1 contained hard, white crystalline lumps. Preblend Samples 2 to 4 were fluffy powders. Any agglomerates present were easily reduced with mild agitation. No differences in powder morphology were noticeable due to the different drying techniques used.

Each preblended sample was transferred to a Erlenmeyer flask and the ammonium thiosulfate added. The mixture was shaken by hand for 40 seconds. Analytical determinations of sulfite and thiosulfate revealed that the contents were uniformly dispersed, and that no decomposition of the ingredients had occurred.

Example IV

The effect of Daxad II KLS on the flowability of a typical silver halide photographic fixer powder formulation was assessed as follows. The following formulation was prepared:

| | Grams Used | |
|---|---|---|
| Component | Sample 1 | Sample 2 |
| Daxad II KLS | 0.0 | 0.28 |
| Sodium Metabisulfite ($Na_2S_2O_5$) | 12.0 | 12.0 |
| Ammonium Thiosulfate ($NH_4S_2O_3$) | 116.0 | 116.0 |
| Sodium Thiosulfite ($Na_2S_2O_3$) | 11.0 | 11.0 |
| Sodium Gluconate | 2.0 | 2.0 |
| $Na_2H_2EDTA$ | 0.2 | 0.2 |

Both formulations were prepared by grinding in a mortar and pestle and stored in sealed glass jars at 50° C. The formulation without the Daxad was severely caked after one day storage, while the formulation with Daxad remained free flowing after 10 weeks storage.

Example V

COLOR PRINT RAPID ACCESS BLEACH-FIX

| | Gms | % w/w |
|---|---|---|
| Potassium metabisulfite | 16.1 | 10.6 |
| Daxad II KLS | 0.49 | 0.3 |
| Ammonium thiosulfate | 71.0 | 46.9 |
| Trisodium hydroxyethylenediamine-tetraacetic acid hydrate | 3.90 | 2.6 |
| Ammonium ferric EDTA hydrate | 47.57 | 31.4 |
| Ammonium acetate | 12.3 | 8.1 |
| Total | 151.36 | 100% |

To each liter of water, 151.37 grams of the above powder formulation was added to bleach-fix color prints. The resulting solution had a pH of 5.45. A powder bleach-fix regenerator was also formulated and had the benefit of significantly reduced volume build and greater bleach-fix stability from sulfurization.

While invention has been described in detail and with reference to the specific embodiments thereof, it will be apparent to one skilled in the art that various changes and modifications can be made therein without departing from the spirit and scope thereof.

What is claimed is:

1. A flowable powdered mixture comprising (a) a member selected from the group consisting of a hygroscopic alkaline thiosulfate, a hygroscopic alkaline sulfite, and a mixture thereof, and (b) a dry alkali metal [arylsulfonate.formaldehyde] *arylsulfonate•formaldehyde* in an amount from about 0.05 to 10%, by weight, of said mixture which is effective to provide flowability to the mixture.

2. A flowable powdered mixture as claimed in claim 1, comprising a hygroscopic alkaline sulfite and a dry alkali metal [arylsulfonate.formaldehyde] *arylsulfonate•formaldehyde*.

3. A flowable powdered mixture as claimed in claim 2, wherein said alkaline sulfite is selected from the group consisting of hygroscopic ammonium sulfite and hygroscopic potassium sulfite.

4. A flowable powdered mixture as in claim 2, further comprising an alkali metal bisulfite.

5. A flowable powdered mixture as claimed in claim 2, further comprising a hygroscopic alkaline thiosulfate.

6. A flowable powdered mixture as claimed in claim 5, wherein said alkaline thiosulfate comprises ammonium thiosulfate, said alkaline sulfite comprises ammonium sulfite monohydrate and said alkali metal [arylsulfonate.formaldehyde] *arylsulfonate•formaldehyde* comprises potassium [naphthalene sulfonate.formaldehyde] *naphthalenesulfonate•formaldehyde*.

7. A flowable powdered mixture as claimed in claim 1, wherein said alkali metal [arylsulfonate.formaldehyde] *arylsulfonate•formaldehyde* is potassium naphthalene sulfonate-formaldehyde.

8. A flowable powdered mixture as claimed in claim 1, further comprising a powdered photographic bleaching agent.

9. A flowable powdered mixture as claimed in claim 8, wherein said photographic bleaching agent comprises a ferric complex of an aminopolycarboxylic acid.

10. A flowable powdered mixture comprising an hygroscopic alkaline thiosulfate and a dry alkali metal [arylsulfonate.formadehyde] *arylsulfonate•formaldehyde* in an amount from about 0.05 to 10%, by weight, of said mixture to provide flowability to the alkaline thiosulfate.

11. A method of making a flowable alkaline thiosulfate powdered mixture comprising mixing (a) a hygroscopic alkaline thiosulfate with (b) a dry alkali metal [arylsulfonate.formaldehyde] *arylsulfonate•formaldehyde* in an amount from about 0.05 to 10%, by weight, of said mixture which is effective to provide flowability to the mixture.

12. A method as claimed in claim 11, wherein said hygroscopic alkaline thiosulfate is selected from the group consisting of ammonium thiosulfate and potassium thiosulfate.

13. A method as claimed in claim 11, further comprising mixing an alkaline sulfite with said hygroscopic alkaline thiosulfate and said alkali metal [arylsulfonate.formaldehyde] *arylsulfonate•formaldehyde*.

14. A method as claimed in claim 13, wherein said mixing further comprises the following steps:

(1) blending said alkaline sulfate with 0.5 to 5% by weight of said alkali metal [arylsulfonate.formaldehyde] *arylsulfonate•formaldehyde*;

(2) if the moisture content of the resulting mixture is above about 2.0 wt %, then drying the resulting mixture (a) at 80° C. for 1.5 to 2 hours, (b) at room temperature for approximately 12 hours, or (c) at 50° C. for 1.5 to 2 hours under a vacuum of 30 inches Hg, or (d) at a temperature and for a time and at a pressure condition substantially equivalent to (a) or (b) or (c);

(3) grinding the mixture to a substantially powder form to form a preblended mixture; and (4) blending the thus-formed preblended mixture with an alkaline thiosulfate in an amount effective to render said alkaline thiosulfate freely flowable.

15. A method as claimed in claim 13, wherein said alkaline thiosulfate comprises ammonium thiosulfate, said alkaline sulfate comprises ammonium sulfite monohydrate and said alkali metal [arylsulfonate.formaldehyde] *arylsulfonate•formaldehyde* comprise potassium [naphthalene sulfonate.formaldehyde] *naphthalenesulfonate•formaldehyde*.

16. A method as claimed in claim 15, wherein said alkali metal [arylsulfonate.formaldehyde] *arylsulfonate•formaldehyde* comprises potassium [naphthalenesulfonate.formaldehyde] *naphthalenesulfonate•formaldehyde*.

17. A method as claimed in claim 16, wherein said alkaline thiosulfate comprises ammonium thiosulfate and is present in an amount of from about 40 to 80% by weight; said alkaline sulfite comprises ammonium sulfite monohydrate and is present in an amount of from about 20 to 60% by weight, and said potassium [naphthalenesulfonate.formaldehyde] *naphthalenesulfonate•formaldehyde* is present in amount of from about 0.1 to 10% by weight, all individual weights being based on the final mixture weight.

18. A method as claimed in claim 14, wherein said method comprises grinding said mixture of alkaline sulfite and alkali metal [arylsulfonate.formaldehyde] *arylsulfonate•formaldehyde* obtained in step (3) to a particle size of between 100 and 200 μm.

19. A method as claimed in claim 13, wherein said alkaline sulfite comprises ammonium sulfite monohydrate, and wherein said method comprises admixing said ammonium sulfite monohydrate within alkali metal metabisulfite in an amount effective to stabilize said ammonium sulfate monohydrate.

20. The product of the method of claim 11.

21. The product of the method of claim 17.

22. The product of the method of claim 19.

23. A method of mating an improved fixing solution comprising the steps of (1) mixing a hygroscopic alkaline thiosulfate, a hygroscopic alkaline sulfite and a dry alkali metal [arylsulfonate.formaldehyde] *arylsulfonate•formaldehyde* in an amount from about 0.05 to 10%, by weight, of said mixture which is effective to provide flowability to the blended mixture, and (2) dissolving the thus-formed blended mixture into an aqueous solution.

24. A method as claimed in claim 23, wherein said mixing further comprises the following steps:

(1) forming an initial mixture by blending alkaline sulfite with 0.1 to 10% of an alkali metal [arylsulfonate.formaldehyde] *arylsulfonate•formaldehyde* based on initial mixture weight;

(2) if the moisture content of the initial mixture is above about 2.0 wt, then drying the resulting mixture at 80° C. for 1.5 to 2 hours or at room temperature for approximately 12 hours, or (c) at 50° C. for 1.5 to 2 hours under a vacuum of 30 inches of Hg, or (d) at a temperature and for a time and a pressure condition substantially equivalent to (a) or (b) or (c);

(3) grinding the initial mixture to at least a substantially granular or powder form;

(4) blending the thus-formed dry and ground preblended initial mixture with an alkaline thiosulfate; and (5) dissolving the thus-formed blended mixture into an aqueous solution.

25. The product of the method of claim 23.

* * * * *